US007116995B2

(12) United States Patent
Savinen et al.

(10) Patent No.: US 7,116,995 B2
(45) Date of Patent: Oct. 3, 2006

(54) SYSTEM AND METHOD FOR OPERATING INTRAVENDOR AND INTERVENDOR MESSAGING SYSTEMS

(75) Inventors: Teppo Savinen, Vihti (FI); Ville Warsta, Helsinki (FI)

(73) Assignee: Nokia Corporation, Espoo (FI)

( * ) Notice: Subject to any disclaimer, the term of this patent is extended or adjusted under 35 U.S.C. 154(b) by 567 days.

(21) Appl. No.: 10/161,323

(22) Filed: May 31, 2002

(65) Prior Publication Data
US 2003/0224809 A1    Dec. 4, 2003

(51) Int. Cl.
*H04Q 7/20* (2006.01)
(52) U.S. Cl. ............... 455/466; 455/418; 455/414.1; 455/553; 455/557; 709/206; 709/207
(58) Field of Classification Search ............. 455/466, 455/418, 414.1, 422, 413, 553, 557, 554, 455/548; 709/219, 206, 207
See application file for complete search history.

(56) References Cited

U.S. PATENT DOCUMENTS

| | | | | |
|---|---|---|---|---|
| 5,822,700 | A  * | 10/1998 | Hult et al. | 455/466 |
| 5,839,075 | A  * | 11/1998 | Haartsen et al. | 455/450 |
| 5,918,181 | A | 6/1999 | Foster et al. | |
| 6,295,449 | B1 | 9/2001 | Westerlage et al. | |
| 6,321,257 | B1* | 11/2001 | Kotola et al. | 709/219 |
| 6,366,609 | B1 | 4/2002 | Rossi | |
| 6,795,711 | B1* | 9/2004 | Sivula | 455/466 |
| 2001/0005675 | A1* | 6/2001 | Aho | 455/412 |
| 2001/0039589 | A1* | 11/2001 | Aho et al. | 709/230 |
| 2001/0040900 | A1* | 11/2001 | Salmi et al. | 370/487 |
| 2001/0053687 | A1* | 12/2001 | Sivula | 455/412 |
| 2003/0023669 | A1* | 1/2003 | DeLima et al. | 709/203 |
| 2003/0100321 | A1* | 5/2003 | Rao et al. | 455/466 |
| 2003/0114140 | A1* | 6/2003 | Iivonen et al. | 455/406 |

OTHER PUBLICATIONS

Push Messaging, http://www.cs.tufts.edu/g/193WAP/notes/PushMsg-WTI.php3, accessed May 13, 2002.
Nokia Multimedia Messaging, Show what you mean, © 2001.
Wireless Application Protocol Wap 2.0 Technical White Paper, www.wapforum.org, Jan. 2002.
Specification Change Document Wap-209_102-MMSEncapsulation-20010928-a, version Sep. 28, 2001.
Specification Information Note Wap-206_101-MMSCTR-20011009-a, version Oct. 9, 2001.

(Continued)

*Primary Examiner*—Joseph Feild
*Assistant Examiner*—Julio Perez
(74) *Attorney, Agent, or Firm*—Hollingsworth & Funk, LLC

(57) ABSTRACT

A system and method for enabling the operation of intervendor and intravendor messaging service systems within an operator network includes correctly routing data messages and handshaking messages between the various system components. In one aspect, the present invention uses the uniform resource identifier of a particular messaging system to route one or more handshaking messages from a target terminal to the particular messaging system. In another aspect, the present invention uses a message transaction identification embedded in the handshaking message to direct the handshaking message to the correct messaging service system. In one embodiment, the transaction identification is analyzed by a load balancing switch to determine the location of the particular messaging service system. In another embodiment, one or more of the several messaging service systems in the operator network are used to analyze the transaction identification to determine the location of the particular messaging service system.

52 Claims, 13 Drawing Sheets

OTHER PUBLICATIONS

3rd Generation Partnership Project; Technical Specification Group Terminals; Multimedia Messaging Service (MMS); Functional Description: Stage 2 (Release 5), 3GPP TS 23.104 V5.1.0, Dec. 2001.

WAP MMS Client Transaction, version Jun. 12, 2001.

Wireless Application Protocol MMS Encapsulation Protocol Version, Jan. 5, 2002.

Multimedia Messaging Service- MMS A Darwinian Approach to Communication, Feb. 2001.

* cited by examiner

SYSTEM AND METHOD FOR OPERATING INTRAVENDOR AND INTERVENDOR MESSAGING SYSTEMS

FIELD OF THE INVENTION

The present invention relates generally to network communications systems, and more particularly, to a system and method for enabling the operation of intravendor and intervendor messaging systems in one operator network.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. The proliferation of local, regional, and global networks, such as the Internet, has made available to users a vast sea of information. These networking technologies have expanded to increasingly include wireless and mobile technologies. Through these networks, messaging information can be transferred between desktop systems, wireless systems, mobile systems, etc. For example, multimedia messaging information available via the Internet can now be transferred between mobile wireless units, such as cellular telephones, personal digital assistants (PDAs), laptop computers, etc. Multimedia messaging information may also be transferred between mobile units and email servers.

One such technology facilitating the transfer of Internet content to and from wireless devices is the Wireless Application Protocol (WAP), which integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, which allows wireless device users to enjoy the benefits of the Internet across both platforms.

Second generation wireless service, often referred to as 2G wireless service, is a current wireless service based on circuit-switched technology. 2G systems, such as Global System for Mobile communications (GSM) and Personal Communications Services (PCS), use digital radio technology for improved quality and a broader range of services over first generation mobile technologies. 3G, or third generation, refers to a set of digital technologies that promises improvements in capacity, speed, and efficiency by deploying new packet-based transmission methodologies between terminals and the network. Users of 3G devices and networks will have access to multimedia services such as video-on-demand, video conferencing, fast WEB access and file transfer.

The demand for multimedia messaging between mobile terminals and between mobile wireless devices and internet-connected devices is increasing. It is often desirable or necessary to operate two or more messaging systems within one operator network. The two or mores messaging systems may include messaging systems of one vendor, or the messaging systems of several vendors. The present mobile communication standards, such as those disseminated by the WAP forum and $3^{rd}$ generation partnership project (3GPP), lack the option of supporting several messaging systems in one operator network.

There is a need in the communications industry for a system and method providing a standardized approach to facilitate the operation of multiple messaging systems in an operator network. There exists a further need for such a system and method that is capable of supporting legacy mobile terminals that do not comply with newer standardized solutions. The present invention provides a solution to these and other shortcomings of the prior art, and offers additional advantages over the prior art.

SUMMARY OF THE INVENTION

The present invention is directed to a system and method for enabling multiple messaging systems in an operator network. A method according to the present invention involves initiating a message transaction by sending a message from an originator terminal to a target terminal. The message is stored on a particular messaging system in an operator network having several messaging systems. One or more handshaking messages are directed from the target terminal to the particular messaging system, each handshaking message indicating a status of the message transaction.

Another embodiment of the invention a system includes a first and a second mobile terminal. The first mobile terminal initiates a message transaction by sending a message to the second mobile terminal. A particular messaging service system is coupled to the first and the second mobile terminals and occupies an operator network including several messaging service systems. The particular messaging service system stores the message sent by the first mobile terminal and receives handshaking messages directed to the particular messaging service system from the second mobile terminal regarding the status of the message transaction.

In yet another embodiment of the invention, a system includes means for initiating a message transaction by sending a message from an originator terminal to a target terminal, means for storing the message on a particular messaging system in the operator network having several messaging systems, and means for directing one or more handshaking messages from the target terminal to the particular messaging system, each handshaking message indicating a status of the message transaction.

A further embodiment of the invention includes a computer-readable medium having computer-executable instructions for sending messaging information between an originator terminal and a target terminal in an operator network having several messaging systems. The computer-executable instructions performs a method the includes initiating a message transaction by sending a message from an originator terminal to a target terminal, storing the message on a particular messaging service system in the operator network having several messaging systems and directing one or more handshaking messages from the target terminal to the particular messaging service system, each handshaking message indicating a status of the message transaction.

DETAILED DESCRIPTION OF VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

Figure 1:
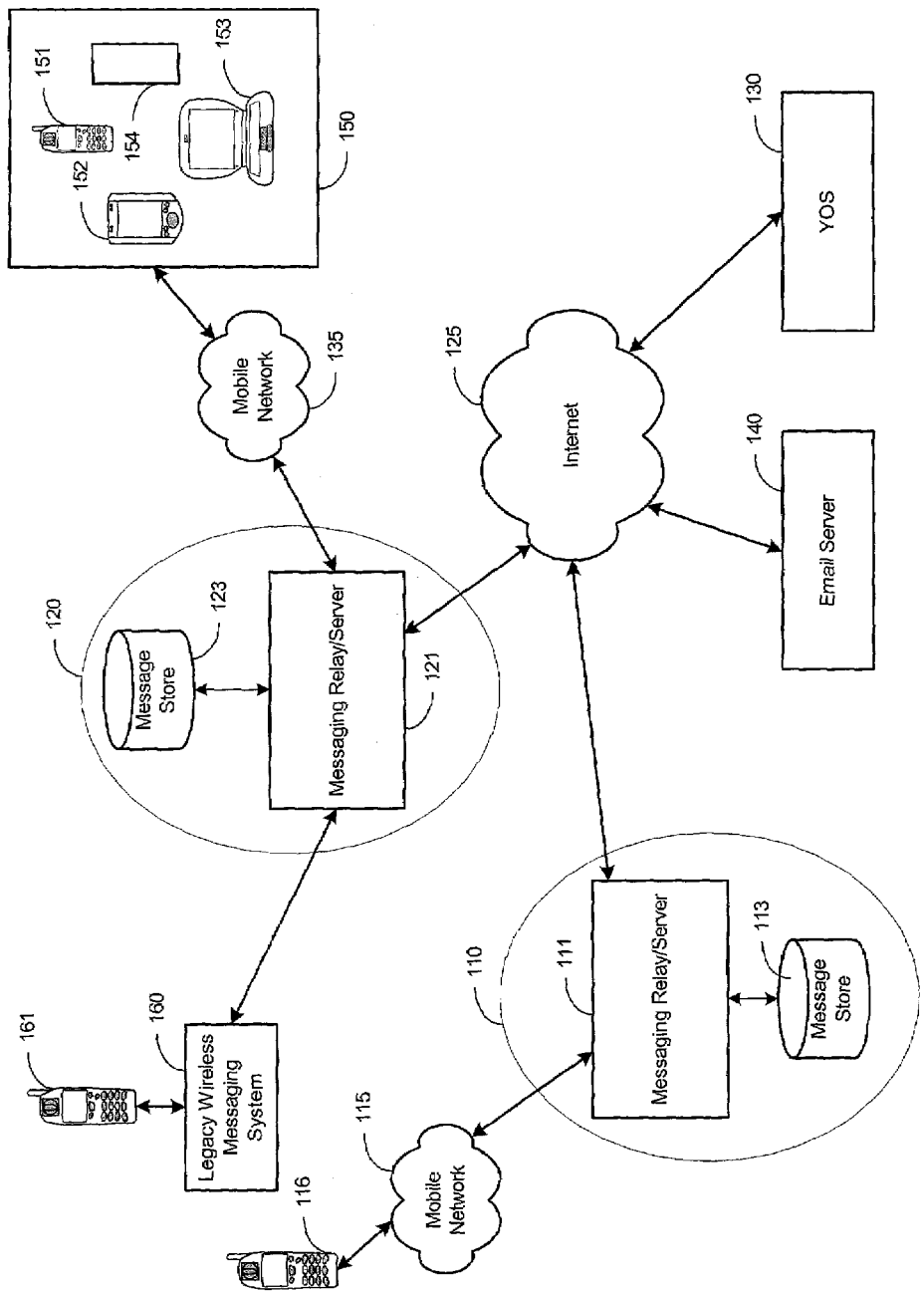
FIG. 1 is a diagram of various architectural elements in a messaging system.

Messaging between wireless communication devices and between wireless and wired communication devices may encompass many different network types, communication protocols, and communication devices. FIG. 1 illustrates a general messaging architecture that may be used to accommodate various types of messaging services, including, for example, short messaging service (SMS), enhanced messaging service (EMS), and multimedia messaging service (MMS).

The basic functionality of a messaging service is provided by a messaging service system. The messaging service system supports the message storage, notification, and forward operations of the messaging service. In the example of FIG. 1, a messaging service system 120 comprises a messaging server/relay 121 and an associated messaging storage device 123. The messaging service system may be connected through a mobile network 135 to one or more mobile terminals 150.

The mobile network 135 may incorporate advanced wireless communication protocols, such as those standardized by the $3^{rd}$ Generation Partnership Project (3GPP), providing significant gains in network capacity over previous technologies. These protocols enable advanced video and multimedia services when used with multimedia devices. Multimedia devices such as personal data assistants (PDA's) 152, multimedia mobile telephones 151, handheld or laptop computers 153, as well as other wireless devices 154 may be connected to the messaging service system 120 and may provide messaging content in several formats, such as picture, text, audio or video. The messaging service system 120 is responsible for storage and handling of ingoing and outgoing messages and for the transfer of messages to different messaging systems, if required. The messaging service system 120 may be coupled, for example, to other similar messaging service systems 110, or to email servers 140 or yet other servers (YOS) 130 accessible through the internet 125. This level of connectivity allows a variety of messaging formats to be transmitted between mobile wireless devices and internet connected devices.

A message transaction is initiated when an originator terminal sends a message to a target terminal. This event is the first in a series of data and handshaking communications that may occur between various devices involved in transferring the message from the originator to the target. The message from the originator terminal may be stored on a message server and, at some later time, be retrieved by or delivered to the target terminal. In one example, messages may be routed between the wireless terminals and the message server through a wireless network, wherein each device uses a compatible communication protocol. Alternatively, messages may be routed between the wireless terminals and the message server with the employment of a proxy device capable of offering mobile service enhancements. For example, a proxy device, such as a WAP wireless proxy, may be used to address communication privacy concerns, or to offer push functionality allowing the messaging service system to asynchronously send information to a mobile device. Furthermore, a translation device may be required to provide compatibility between the communication protocols of the wireless devices and the messaging service system, for example. More specifically, the system may utilize a WAP gateway to handle the protocol interworking between the mobile terminals and the message server.

Figure 2:
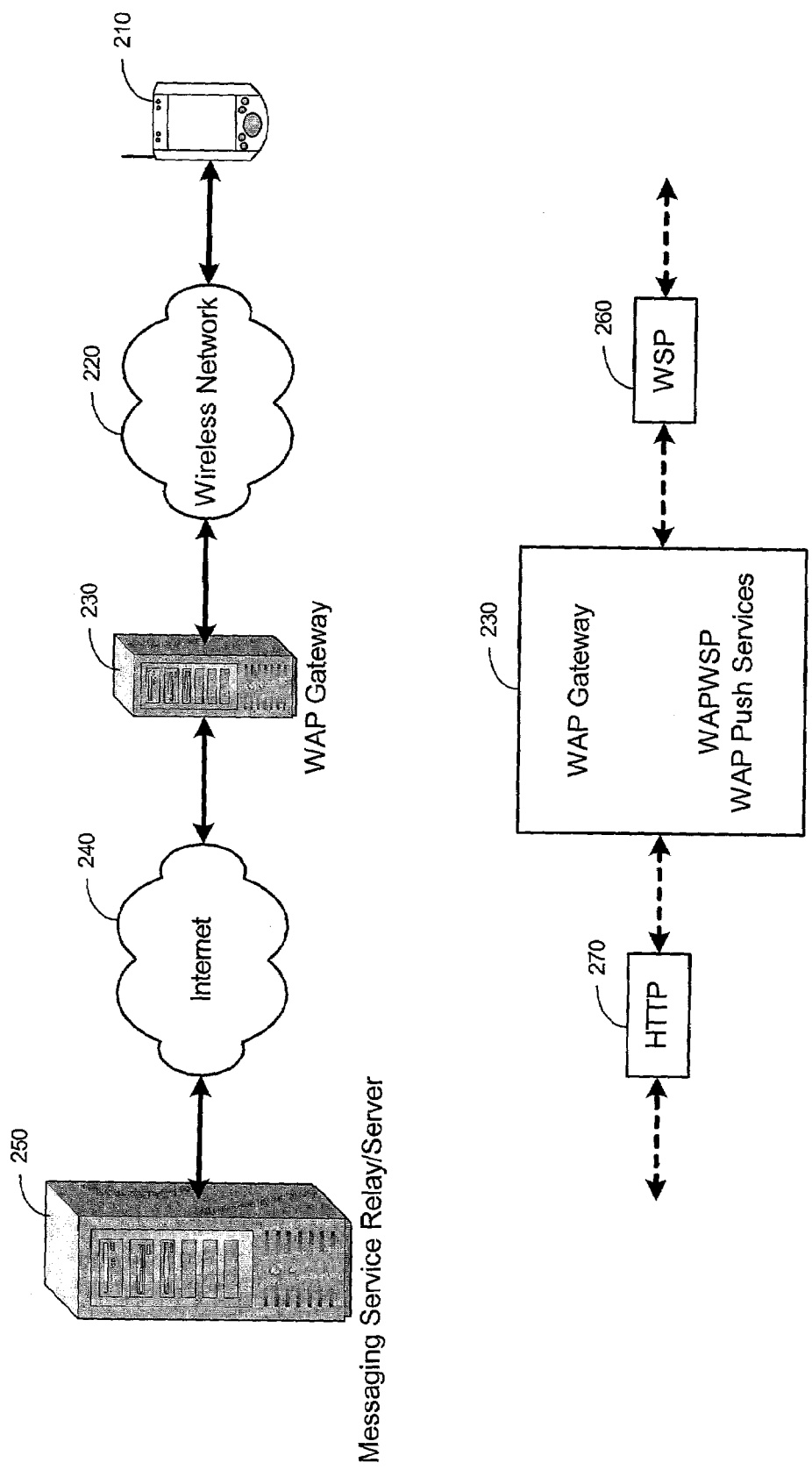
FIG. 2 is a diagram showing a wireless application protocol (WAP) implementation of a messaging service system interface.

FIG. 2 provides an example of a transmission path between a wireless messaging terminal 210 and a messaging relay/server 250 of a messaging service system. In this example, a wireless terminal 210 is coupled to the messaging server/relay 250 through a wireless application protocol (WAP) gateway 230. The WAP gateway provides a standardized protocol for linking wireless devices to the internet. The gateway 230 supports interface protocols used for wireless communications and is compatible for use with multimedia messaging services. For example, a multimedia message may transit from the wireless terminal 210 though a mobile network 220 to the WAP gateway 230 using WAP session protocol (WSP) 260 and/or WAP PUSH services. From the WAP gateway 230, the multimedia message may be transmitted to the messaging relay/server 250 over the internet 240 using HTTP format 270.

Figure 3A:
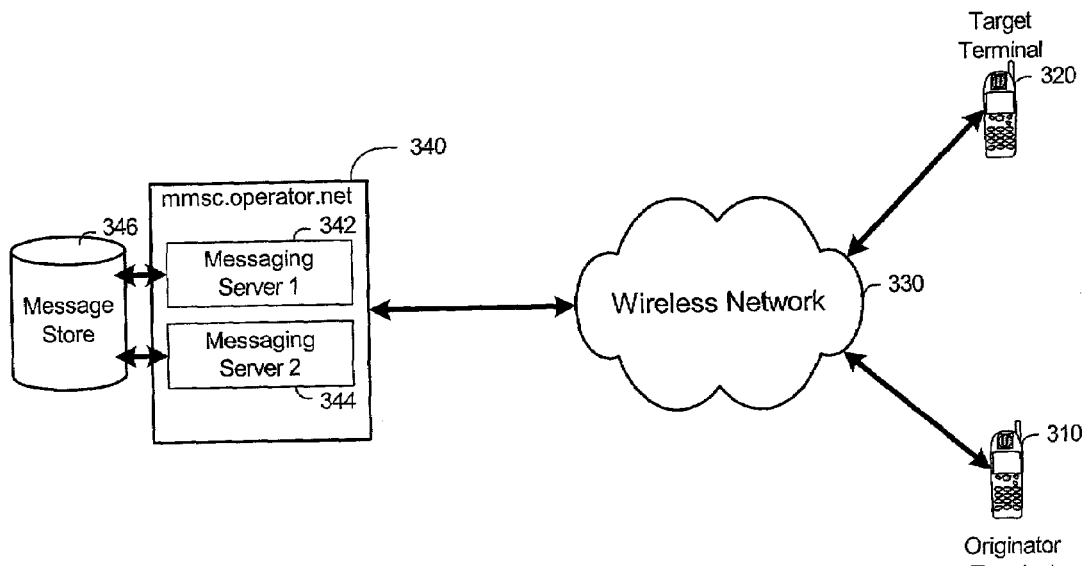
FIGS. 3A and 3B are block diagrams illustrating various messaging service system components providing messaging service for two mobile terminals coupled through a wireless network.

FIG. 3A illustrates various messaging service system components providing messaging service for two mobile terminals 310, 320. In this example, the wireless terminals 310, 320 are coupled together and to a messaging service system 340 through a wireless network 330. The messaging service system 340 may include one or more messaging servers 342, 344 and one or more message storage devices 346. More generally, the devices may be coupled via a number of communication pathways, including, for example, those illustrated in FIG. 1.

Figure 3B:
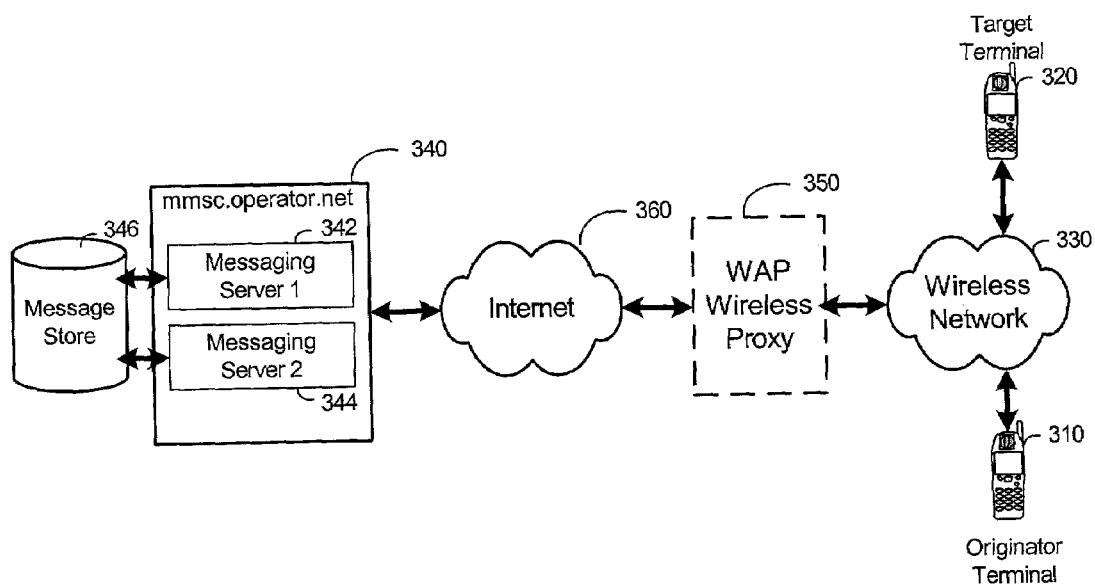

In the example illustrated in FIG. 3B, the devices involved in a message transaction include the originator terminal 310, the target terminal 320, and the messaging service system 340. In this example, the terminals 310, 320 are connected through a wireless network 330 to a proxy device 350 utilizing a wireless communication protocol such as WAP. The WAP wireless proxy 350 may be coupled through the internet 360 to the messaging service system 340. The messaging service system may include one or more messaging servers 342, 344 and one or more message storage devices 346.

A message is transferred from the originator terminal 310 through the wireless network 330 to the messaging service system 340. The message may be temporarily stored in the messaging service system 340 until the target terminal 320 is located. When the target terminal 320 is located by the messaging service system 340, the messaging service system 340 sends notification to the target terminal 320 that a message has been received.

In response to receiving the notification, the target terminal 320 may invoke an immediate or delayed message retrieval request. Initiation of a message retrieval may be accomplished by the target terminal 320 prompting the target user (not shown) to issue a retrieval request, or the target terminal 320 may invoke the retrieval request automatically. A message retrieval request is sent from the target terminal 320 to the messaging service center 340. Upon receipt of the message retrieval request, the messaging service system 340 delivers the message to the target terminal 320.

Figure 4:
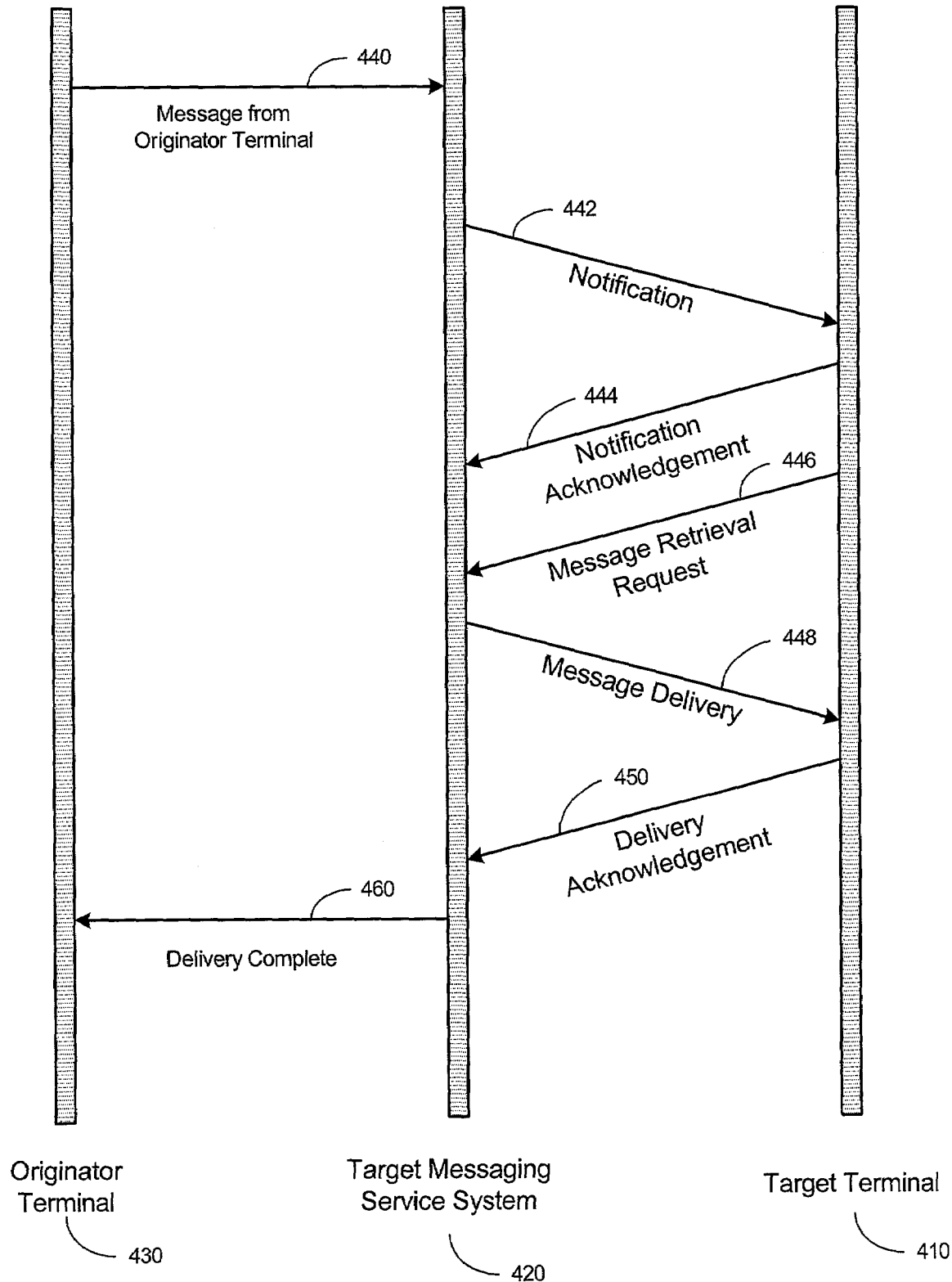
FIG. 4 is a flow diagram illustrating a signal flow between a target terminal and a messaging service system during a message transaction.

FIG. 4 illustrates in more detail the basic structure of a message transaction flow between a messaging service system 420 and a target terminal 410. The message transaction flow includes a series of data and handshaking messages between the messaging service system 420 and the target terminal 410.

The message transaction flow begins when a message 440 is sent by an originator terminal 430 directed to a target terminal 410 via the messaging service system 420. The message 440 may be posted to the target messaging service system 420, for example, using the WSP/HTTP POST format. The message 440 may be stored in the messaging service system 420 for a period of time. When the messaging service system 420 locates the target terminal 410, the messaging service system 420 sends a notification message 442 to the target terminal 410 notifying the target terminal 410 that a message has been received. The target terminal 410 responds to the notification message 442 by transmitting a notification acknowledgement 444 to the messaging service system 420 indicating that the target terminal 410 has received the notification message 442. The target terminal 410 may immediately retrieve the message sent from the originating terminal 430, or may delay retrieving the message for a period of time.

The target terminal 410 invokes message retrieval by sending a message retrieval request 446 to the messaging service system 420. For example, the target terminal 410 may send the message retrieval request 446 using the WSP/HTTP GET format. The messaging service system 420 responds to the message retrieval request 446 by delivering the message 448 to the target terminal 410. The target terminal acknowledges delivery of the message 448 in a delivery acknowledgement 450 directed to the messaging service system 420. The messaging service system may indicate to the originator terminal 430 that the message delivery is complete 460.

In many applications it is desirable or necessary for the messaging service to be distributed among several messaging service systems functioning in one operator network. Distribution of messaging traffic among messaging service systems may be used to achieve a required capacity or response time of messaging service, or to provide messaging system redundancy. Messaging service centers may be located in different geographical locations, providing redundant systems to maintain messaging services in the event of a catastrophic occurrence, for example. Furthermore, it may be desirable for the messaging systems of two vendors to function fluently within the same network space.

Distributing the messaging traffic to several messaging service systems may be accomplished using a load-balancing switch. The load-balancing switch may be programmed with information about the capabilities and services provided by each messaging service system. The load-balancing switch may direct messaging traffic to an appropriate messaging service system based on a variety of load-balancing considerations. For example, the load-balancing switch may distribute messaging based on mobile user and device requirements including subscriber ID, phone number, and device type. Load balancing may also be based on the differences in capabilities of the various messaging systems in the network, including the capacities or response times of the various messaging systems coupled to the switch.

Figure 5:
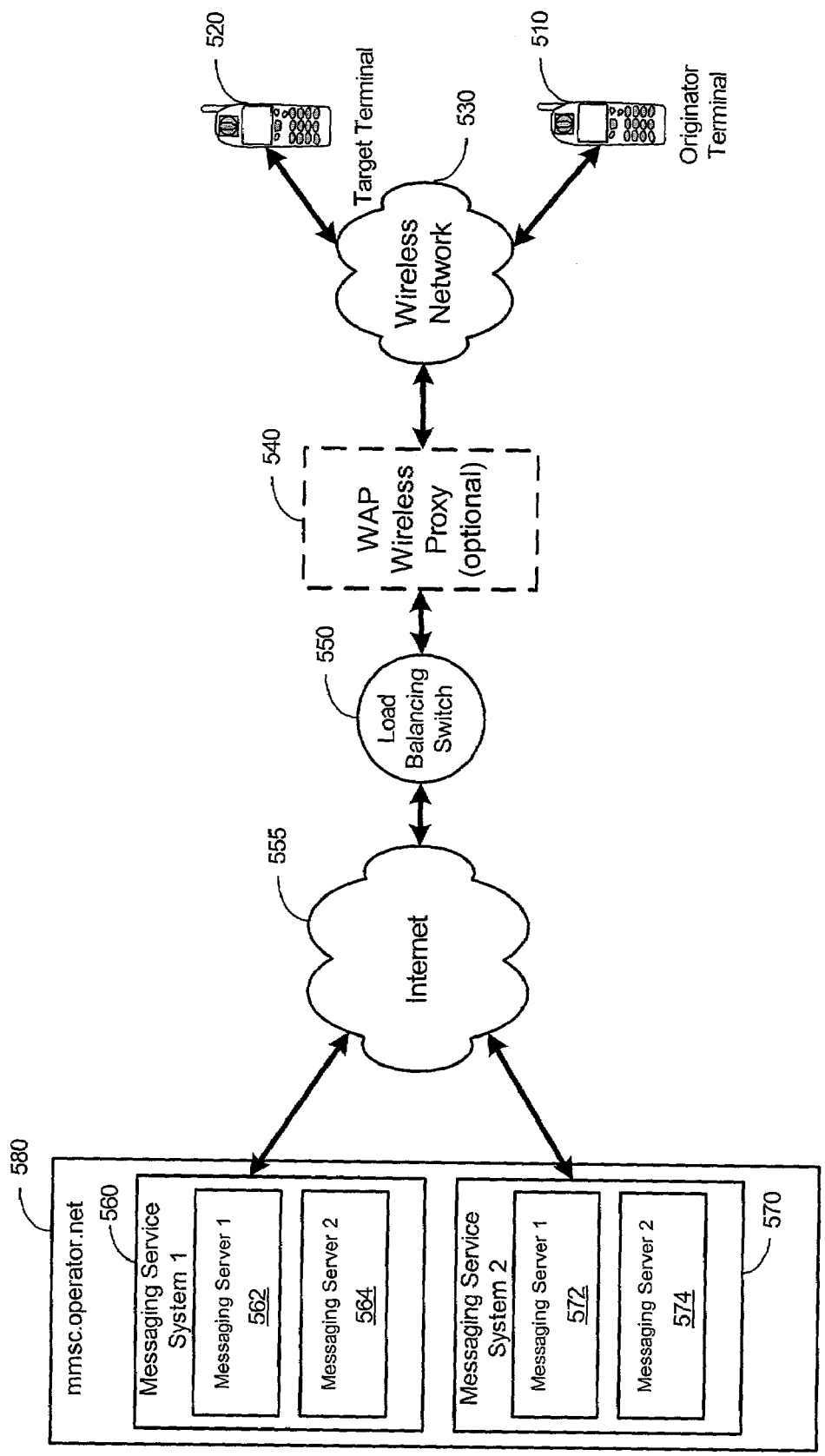
FIG. 5 is a block diagram illustrating a plurality of messaging service systems occupying one operator network and coupled through a load balancing switch.

In general, the wireless devices may be coupled to a load balancing switch through a wireless network, or using a translation device such as a WAP gateway, or using a WAP wireless proxy. An example network system using a load-balancing switch and an optional WAP wireless proxy is illustrated in FIG. 5. In this example, an originator terminal 510 and a target terminal 520 are coupled through a wireless network 530 to a WAP wireless proxy 540. The WAP wireless proxy 540 is coupled to a load balancing switch 550. Two messaging systems 560, 570 operating within one operator network 580 are connected to the switch 550 through an internet connection 555. Although this example shows two messaging systems in the operator network 580, the number of messaging systems may be more than two. Each messaging system 560, 570 may have one or more messaging relay/servers 562, 564, 572, 574 and associated message storage devices (not shown).

The use of a load balancing in operator networks that include several messaging service systems may present particular problems. In these situations, load balancing interjects an additional network element into the message transaction flow. For some messaging systems, such as multimedia messaging, the protocols established by various standards groups, e.g., WAP and 3GPP, do not fully address the communication protocol requirements necessary to operate more than one messaging service system in an operator network.

Figure 6A:
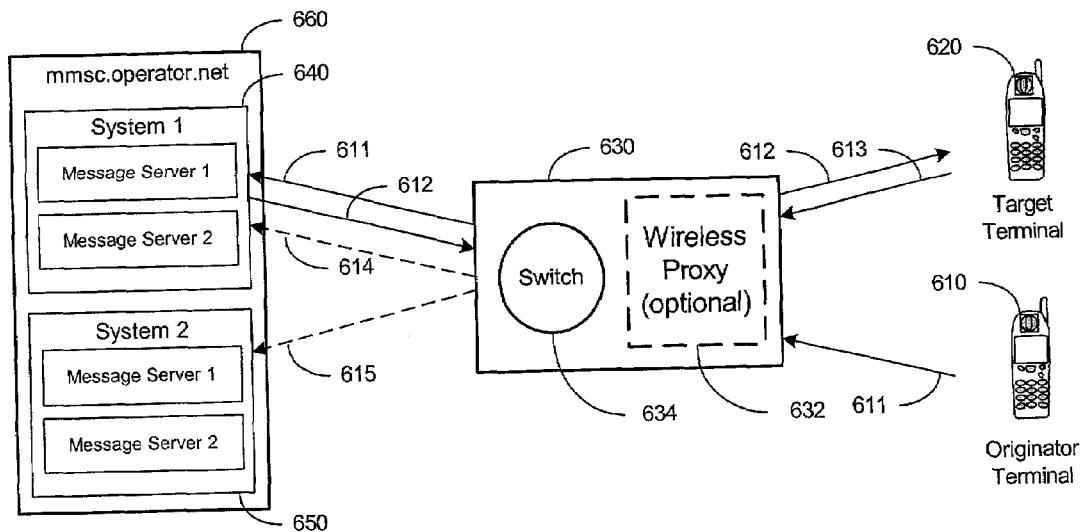
FIGS. 6A and 6B illustrate a conflict in routing handshaking messages in an operator network including a plurality of messaging service systems.
Figure 6B:
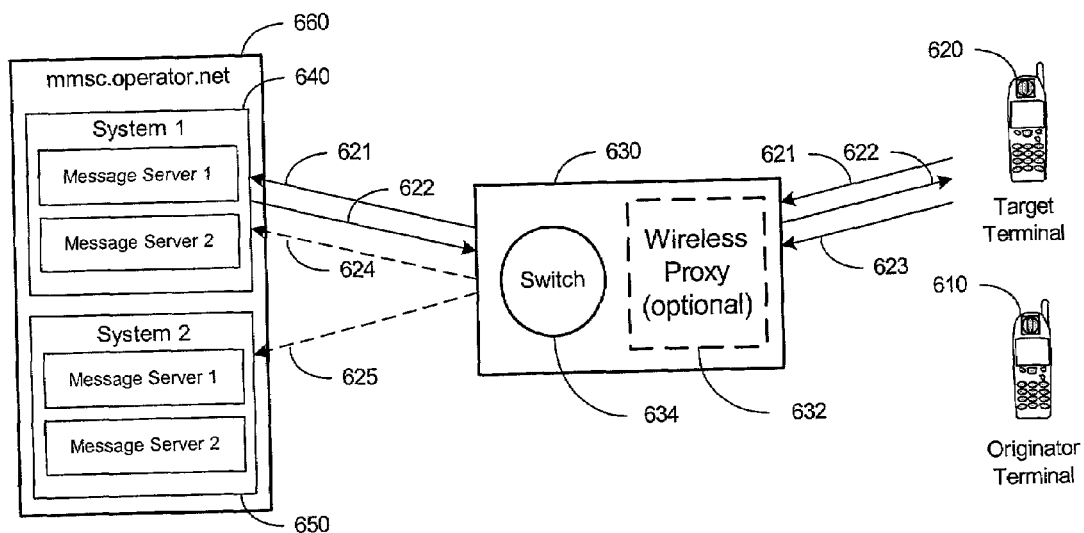

FIGS. 6A and 6B illustrate conflicts in the handshaking protocol of message delivery in connection with messaging services, such as multimedia messaging services, provided using two messaging service systems in one operator network. Turning now to FIG. 6A, a message transaction representative of a message posting and retrieval process is illustrated utilizing a load-balancing switch 634 interposed between wireless devices 610, 620 and two messaging service systems 640, 650 operating in a single operator network 660. The system may include an optional wireless proxy 632, but this is not a required component. The load-balancing switch 634 is used to direct messaging traffic to the messaging service systems 640, 650 in the operator network 660. In this example, both the originator terminal 610 and the target terminal 620 are illustrated as mobile telephones. In other configurations, the messaging terminals 610, 620 may represent a number of different messaging device types and may be connected in various ways, for example, those illustrated in FIG. 1.

The message transaction begins when the originator terminal 610 sends a message 611 directed to a target terminal 620. The message 611 may be sent, for example, through a WSP/HTTP POST command. The WSP/HTTP POST message 611 identifies the location to which the message 611 is directed using the virtual address of the operator network. In the example of FIG. 6, the virtual address of the operator network is provided by the uniform resource identifier (URI) http://mmsc.operator.net. The operator network identified by the URI http://mmsc.operator.net includes two messaging service systems, System-1 640 and System-2 650.

In the example illustrated in FIG. 6, the message 611 from the originator terminal 610 is transmitted via a wireless network to a load-balancing switch 634. From the switch 634, the message 611 is routed to one of the messaging service systems 640, 650 in the operator network 660 identified by http://mmsc.operator.net. The criteria for routing messages may be based on the capacities or response times of the various messaging service systems 640, 650 in the operator network 660, or messages may be distributed based on any desired process. In this example, the load-balancing switch 634 routes the message 611 to System-1 640.

After the message 611 is delivered to messaging service system-1 640, the messaging service system-1 640 responds to the message 611 by directing a notification message 612 to the target terminal 620. The notification message 612 indicates to the target terminal 620 that a message 611 has been received. The notification message 612 is transmitted through the switch 634 to the target terminal 620. The notification message 612 from messaging service system-1 640 to the target terminal 620 provides a URI providing the location of messaging service system-1 640 as well as a message identification for the message 611. Specifically, messaging service system-1 640 provides in the notification message the URI http://mmsc.operator.net/system1/messageid. Thus, the target terminal 620 is made aware of the location of the messaging service system storing the message, in this example, messaging service system-1 640.

Upon receiving the notification message 612 from messaging service system-1 640, the target terminal 620 responds by transmitting a notification acknowledgement message 613. The notification acknowledgement 613 is transmitted by the target terminal 620 through the load-balancing switch 634.

Routing the notification acknowledgement 613 to messaging service system-1 640, where the message is located, becomes problematic at the switch 634. According to the current 3GPP and/or WAP forum standards (3G TS23.140, WAP-206 MMS Client Transactions, WAP-209 MMS Encapsulation) the specific URI of the messaging service system where the message is located is not required to be included in a notification acknowledgement 613. The absence of the specific URI makes it impossible to automatically route the notification acknowledgement 613 to the appropriate messaging service system, in this case, messaging service system-1 640. Under the present protocol, the switch 634 is unable to resolve whether to transmit the notification acknowledgement 613 to messaging service system-1 640 along path 614, or to transmit the notification acknowledgement 613 to messaging service system-2 650 along path 615.

A similar situation occurs in the handshaking protocol associated with message retrieval, as illustrated in FIG. 6B. The target terminal 620 initiates message retrieval by sending a message retrieval request 621 directed to messaging service system-1 640 where the message is stored. The target terminal 620 may send the message retrieval request 621 using, for example, a WSP/HTTP GET request. When initiating message retrieval, the target terminal 620 incorporates within the message retrieval request 621 the specific URI provided in the notification message 612 from the messaging service system 640 where the message is stored, as previously discussed in connection with FIG. 6A. In the example of FIG. 6B, the message retrieval request 621 from the target terminal 620 incorporates the URI http://mmsc.operator.net/system1/, indicating that the message is to be retrieved from messaging service system-1 640.

The message retrieval request 621 is transmitted from the target terminal 620 to messaging service system-1 640. In response to receiving the message retrieval request 621, messaging service system-1 640 transmits the message 622 to the target terminal 620. When the target terminal 620 receives the message 622 from messaging service system-1 640, the target terminal 620 responds by transmitting a delivery acknowledgement 623. The delivery acknowledgement 623 indicates that the message 622 has been delivered. However, according to the current 3GPP and/or WAP forum standards (3G TS23.140, WAP-206 MMS Client Transactions, WAP-209 MMS Encapsulation), the specific URI of the messaging service system from which the message was delivered is not required to be included in a delivery acknowledgement. The absence of the specific URI makes it impossible to automatically route the delivery acknowledgement to the appropriate messaging service system.

In the situation illustrated in FIG. 6B, under the present standard protocol, the switch 634 is unable to resolve whether to transmit the delivery acknowledgement message 623 to messaging service system-1 640 over path 624, or to transmit the delivery acknowledgement 623 to messaging service system-2 650 over path 625.

The use of several messaging service systems in an operator network is not supported under the current WAP and 3GPP standards. The identification of specific messaging service system locations using, for example, the URI's of messaging service systems, is not required to be included in some handshaking messages such as the notification acknowledgement and delivery acknowledgement messages discussed above. This situation may lead to conflicts at the load-balancing switch in determining the messaging service system to which the handshaking messages should be sent. The present invention is directed to a method and system for resolving these and other problems associated with enabling the operation of more than one messaging service system in an operator network.

Figure 7:
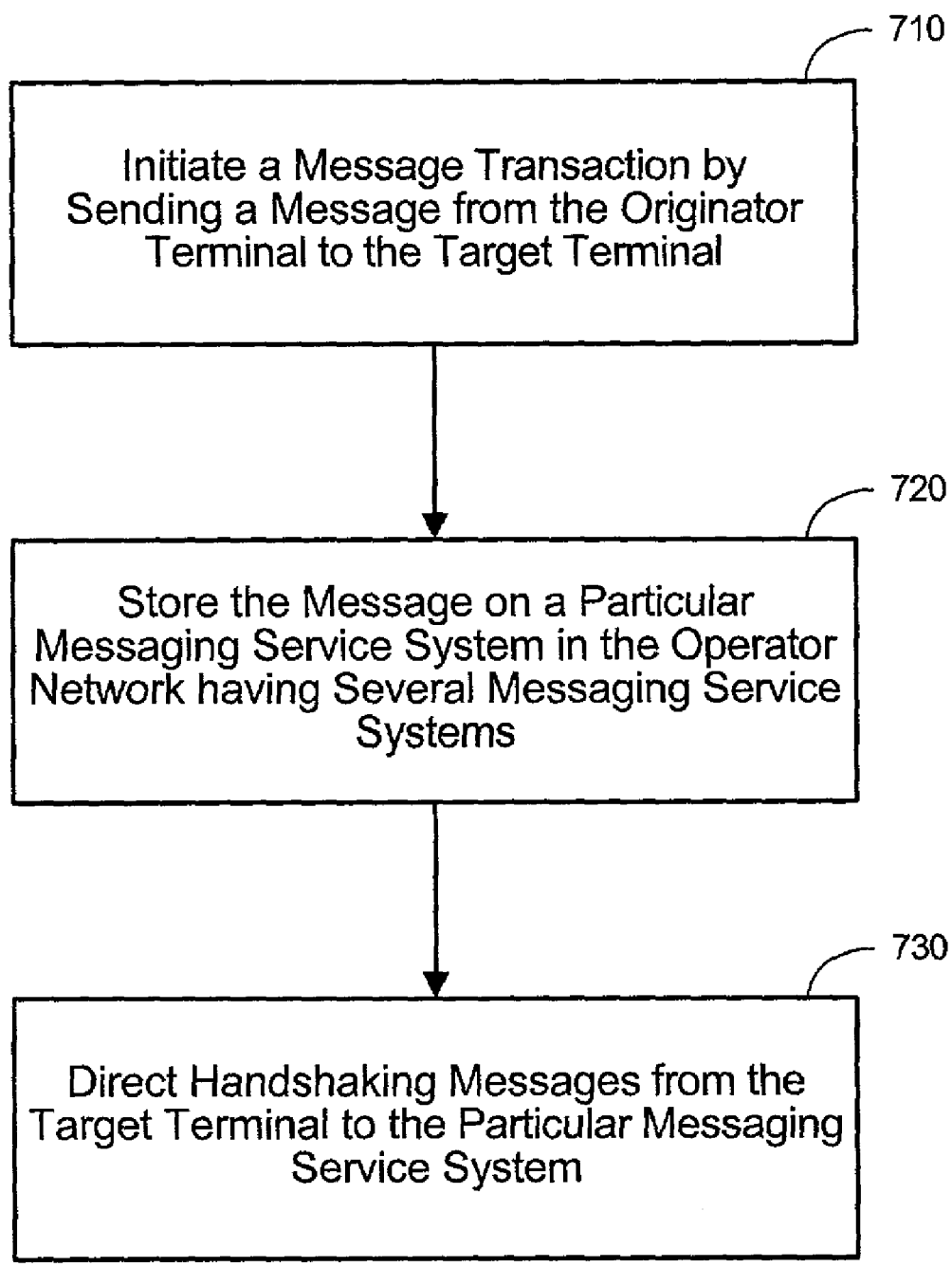
FIG. 7 is a flowchart conceptually illustrating a method of enabling operation of several messaging service systems in one operator network in accordance with an embodiment of the invention.

A method of the invention is conceptually illustrated, in broad and general terms, in the flowchart of FIG. 7. A message transaction is initiated when an originator terminal sends a message to a target terminal 710. The message is stored on a particular messaging system 720 in an operator network having several messaging systems. The messaging systems may be coupled through a load balancing switch that distributes the messages among the messaging systems. A message transaction includes a number of data and handshaking messages that flow between the originator terminal, the messaging service system, and the target terminal. Handshaking messages indicating a status of the message transaction are directed from the target terminal to the particular messaging system where the message is stored 730, enabling the operation of several messaging systems in an operator network.

According to one method of the invention, incorporation the URI of the particular messaging service system where the message is stored is required for acknowledgement messages sent from the target terminal to the particular messaging service system. By this method, the acknowledgement messages may be correctly routed to the particular messaging service system where the message is stored.

Figure 8A:
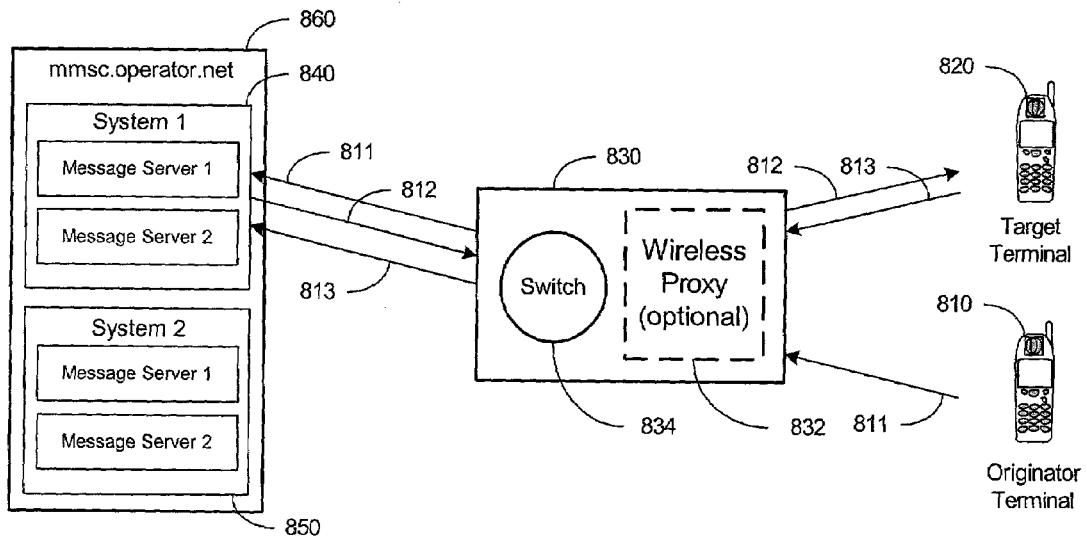
FIGS. 8A and 8B illustrate a method of directing handshaking signals using a uniform resource identifier of a messaging service system in accordance with an embodiment of the invention.

This method is illustrated in the diagram of FIG. 8A. A message 811, directed from an originating terminal 810 to a target terminal 820, is temporarily stored in a particular messaging service system. In the example of FIG. 8A, the message 811 is stored in messaging service system-1 840. Messaging service system-1 840 is located within an operator network 860 including two messaging service systems 840, 850. Although only two messaging service systems 840, 850 are shown in the operator network 860, more than two networks may be included.

After the messaging service system-1 840 receives the message 811, messaging service system-1 840 sends a notification message 812 directed to the target terminal 820. The target terminal 820 responds by sending a notification acknowledgement 813 to messaging service system-1 840. In this embodiment, the notification acknowledgement 813 is posted to the specific URI of the messaging service system storing the message. In the example of FIG. 8A, the notification acknowledgement 813 incorporates the URI of messaging service system-1 840, http://mnsc.operator.net/system1/. Because the notification acknowledgement 813 incorporates the specific URI of messaging service system-1 840, the switch 834 is able to direct to the notification acknowledgement 813 to the correct messaging service system.

Figure 8B:
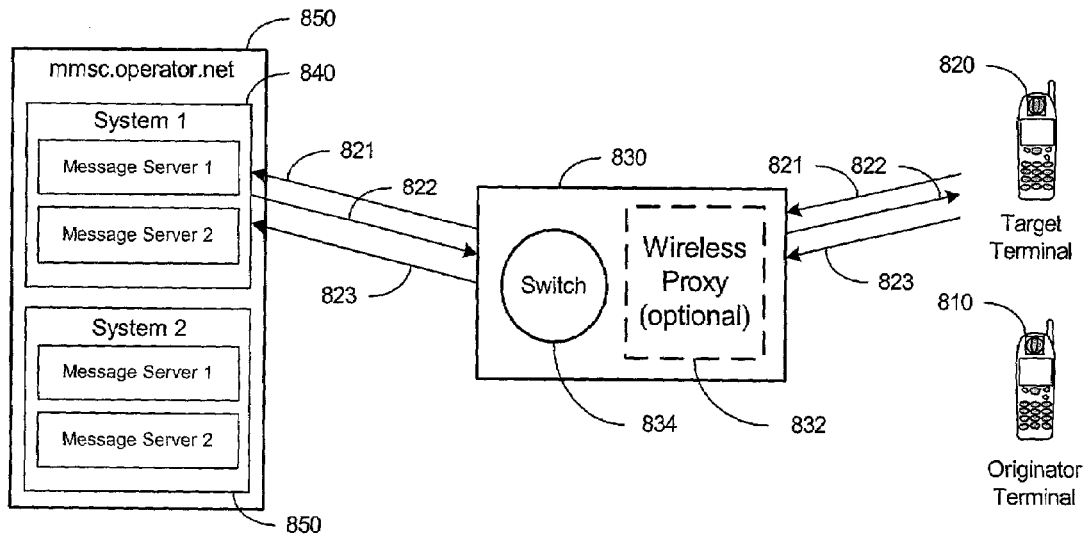

Message retrieval for this embodiment operates in a similar manner, as illustrated in FIG. 8B. The target terminal 820 invokes message retrieval by posting a message retrieval request 821 to messaging service system-1 840. In response to the message retrieval request 821, messaging service system-1 840 transmits the message 822 to the target terminal 820.

The target terminal 820 sends a delivery acknowledgement 823 to messaging service system-1 840. The delivery acknowledgement 823 contains the URI of messaging service system-1 840. In the example of FIG. 8B, the delivery acknowledgement 823 incorporates the URI http://mmsc.operator.net/system1/, which is the URI location for messaging service system-1 840. With the incorporation of the URI in the delivery acknowledgement 823, the switch is able to send the delivery acknowledgement 823 to the correct messaging service system.

One aspect of this embodiment requires the incorporation into the messaging standards, for example 3GPP and/or WAP forum specifications (3G TS23.140, WAP-206 MMS Client Transactions, WAP-209 MMS Encapsulation), a requirement that part of the URI used in a message notification shall be used when delivering responses from a target terminal to a messaging service system. This requirement ensures that acknowledgement messages, such as notification acknowledgement and delivery acknowledgement, will incorporate the URI of the specific messaging service system to which the messages are directed so that the acknowledgement messages can be correctly routed.

Another aspect of this embodiment requires a new information element in the notification message to be required by the standards referenced above. According to this aspect of the invention, a new information element, denoted, for example, "Responses-To" incorporated in the notification message from a messaging service system provides a return location for all acknowledgement messages to the messaging service system. The target terminal is required to use the return location for acknowledgement messages posted to the messaging service system, including, for example, the notification acknowledgement and the delivery acknowledgement.

The embodiments of the present invention discussed above contemplate a change in various existing standards to require the incorporation of the messaging service system URI in acknowledgement messages. Other embodiments of the invention discussed below enable the use of several messaging service systems in one operator network without requiring modification of the standards. Regardless of whether the current standards are modified, the embodiments discussed below are advantageous for use with legacy devices that do not incorporate the standard change.

Figure 9A:
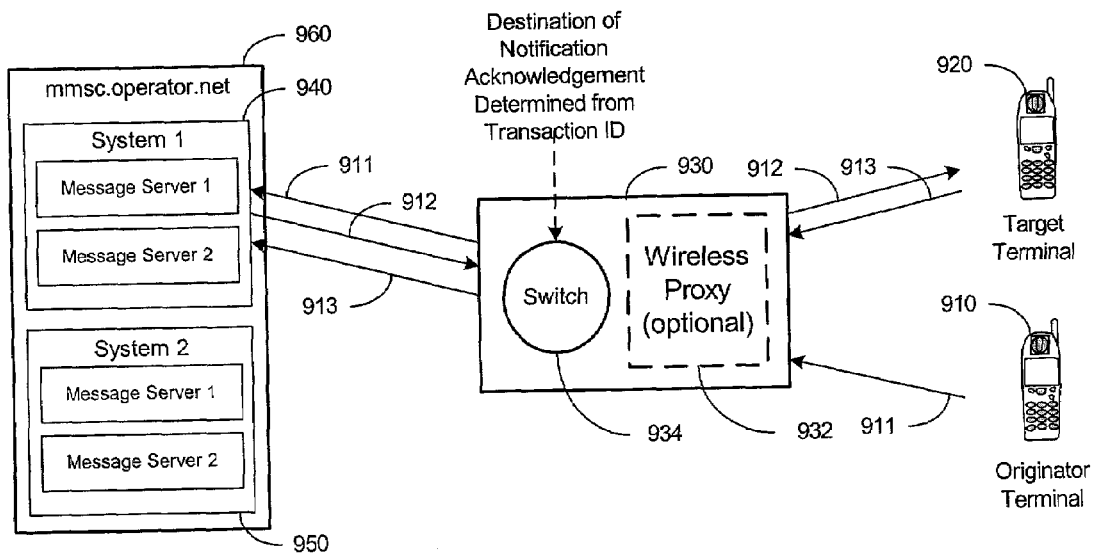
FIGS. 9A and 9B illustrate a method of directing handshaking messages using a load balancing switch to determine the routing of handshaking messages by analyzing a transaction identification in accordance with an embodiment of the invention.
Figure 9B:
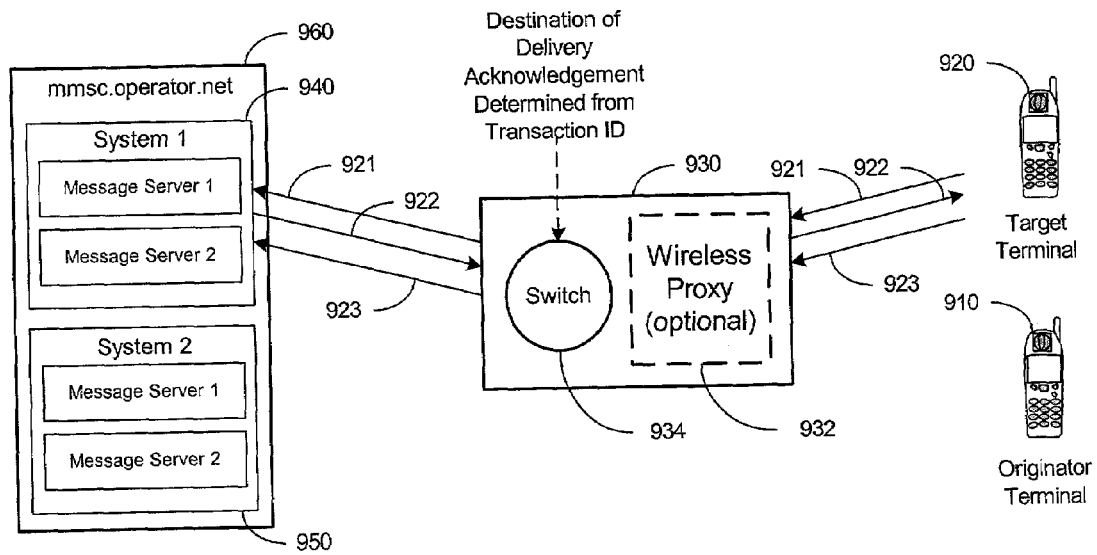

A method of the present invention, illustrated in FIGS. 9A and 9B, uses the load balancing switch to examine a transaction identification that is incorporated into the acknowledgment messages to determine the appropriate routing for acknowledgment messages transmitted by the target terminal. Turning to FIG. 9A, a message transaction is initiated when an originator client 910 posts a message 911 directed to the target terminal 920. The message 911 is routed by the load balancing switch 934 for storage in messaging service system-1 940. Messaging service system-1 940 sends a notification message 912 to the target terminal 920. Under present communication protocols, the notification message 912 includes a transaction identification, or transaction ID, which is used to associate a data packet with a particular message transaction.

The target terminal 920 sends a notification acknowledgement 913 containing the transaction ID to messaging service system-1 940 through the switch 934. The switch 934 examines the transaction ID and, from the information contained in the transaction ID, deduces the messaging service system to which the notification acknowledgement should be routed, in this example, messaging service system-1 940.

Message retrieval in accordance with this embodiment is illustrated in FIG. 9B. Message retrieval is initiated when the target terminal 920 sends a message retrieval request directed to messaging service system-1 940. Messaging service system-1 940 responds by transmitting the message 922 to the target terminal 920. The target terminal 920 acknowledges message receipt by transmitting a delivery acknowledgement 923 incorporating the transaction ID to messaging service system-1 940. The switch 934 analyzes the transaction ID in the delivery acknowledgment 923 from the target terminal 920 and routes the delivery acknowledgement 923 to the proper messaging service system, in this example, messaging service system-1 940.

Figure 10A:
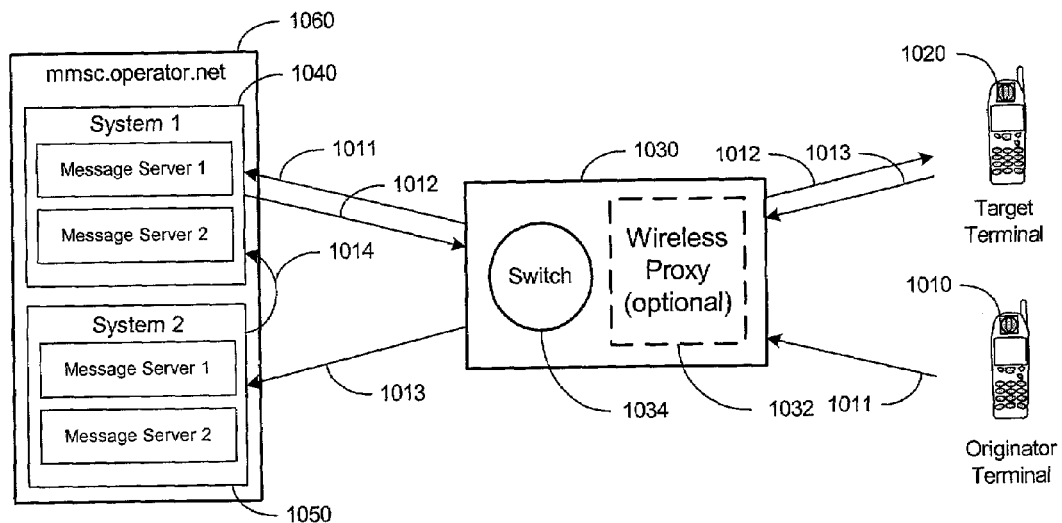
FIGS. 10A and 10B illustrate a method of directing handshaking messages using a randomly selected messaging service system to analyze the message transaction identification in accordance with an embodiment of the invention.

Other embodiments of the invention use the messaging service systems to route the acknowledgement messages to the proper messaging service system. In one embodiment, conceptually illustrated in the diagrams of FIGS. 10A and 10B, the transaction is initiated when the originator terminal 1010 sends a message 1011 directed to the target terminal 1020. The message 1011 is routed by the switch 1034 for storage in messaging service system-1 1040. Messaging service system-1 1040 sends a notification message 1012 containing a transaction ID to the target terminal 1020.

The target terminal 1020 responds to the notification message 1012 by sending a notification acknowledgment 1013 also incorporating the transaction ID to messaging service system-1 1040. The switch 1034 routes the notification acknowledgement 1013 to a random messaging service system in the operator network, in this example, messaging service system-2 1050. Messaging service system-2 1050 receives the notification acknowledgement 1013 and analyzes the transaction ID to determine the proper messaging service system to which the notification acknowledgement 1013 is directed, in this example, messaging service system-1 1040. Messaging service system-2 1050 then transmits the notification acknowledgement 1014 to the messaging service system-1 1040.

Figure 10B:
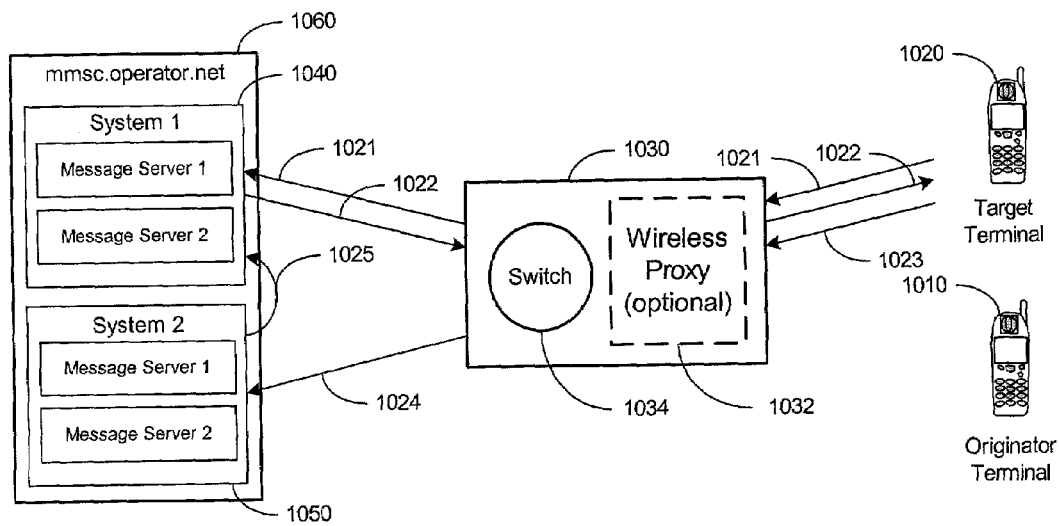

Message retrieval is illustrated in the diagram of FIG. 10B. Message retrieval is initiated when the target terminal 1020 transmits a message retrieval request 1021 to messaging service system-1 1040 requesting message retrieval. Upon receiving the message retrieval request 1021, messaging service system-1 1040 transmits the message 1022 to the target terminal 1020.

Upon receiving the message 1022, the target terminal 1020 transmits a delivery acknowledgement 1023 incorporating the transaction ID. The switch 1034 routes the delivery acknowledgement 1024 to a random messaging service system in the operator network, in this example, messaging service system-2 1050. Messaging service system-2 1050 analyzes the transaction ID incorporated in the delivery acknowledgement 1023 and redirects the delivery acknowledgement 1025 to the proper messaging service system, messaging service system-1 1040.

Figure 11A:
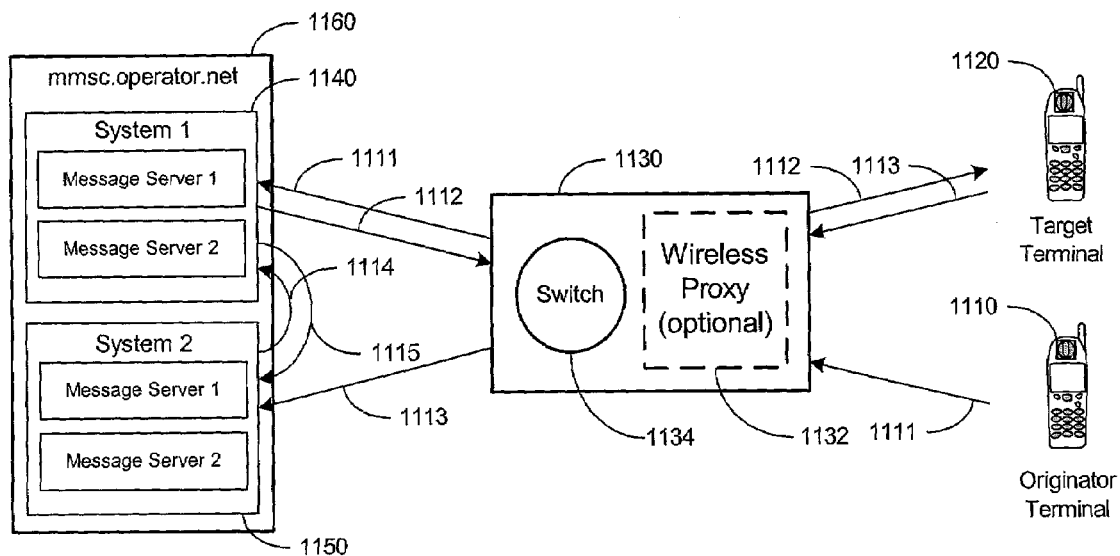
FIGS. 11A and 11B illustrate a method of directing handshaking messages when a message is forwarded without retrieval in accordance with an embodiment of the invention.
Figure 11B:
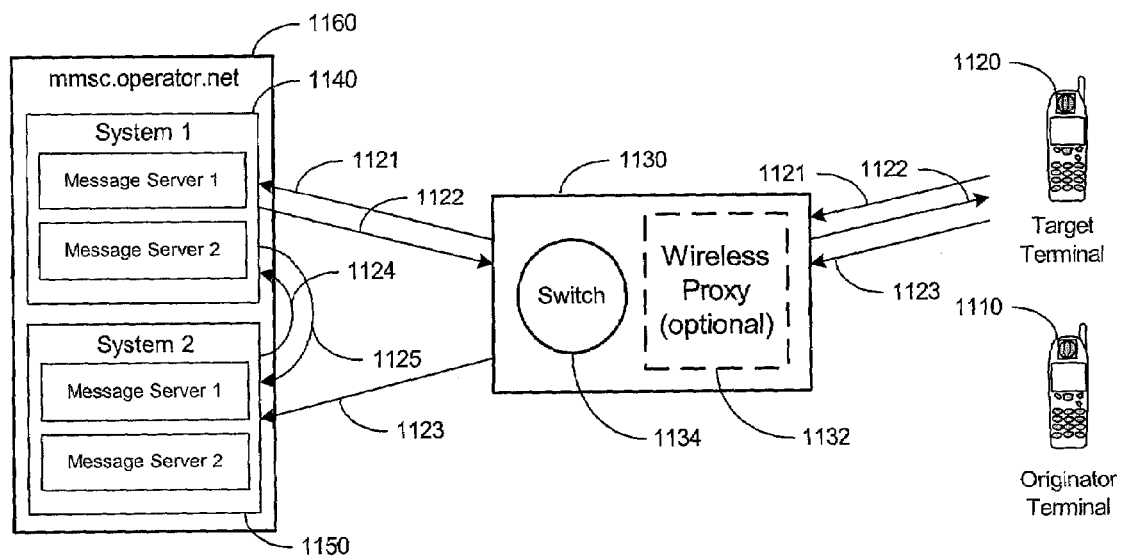

Instead of invoking a message retrieval request, the target terminal may request that a message be forwarded without retrieval. A method of the present invention for handling a message transaction including a forwarding request is illustrated the diagrams of FIGS. 11A and 11B.

In accordance with this embodiment, a message transaction is initiated when an originator terminal 1110 directs a message 1111 to a target terminal 1120. The message 1111 is routed by the switch 1134 for storage in messaging service system-1 1140. Messaging service system-1 1140 transmits a notification message 1112 incorporating a transaction ID to the target terminal 1120.

The target terminal 1120 responds to the message notification 1112 by transmitting a forwarding without retrieval request 1113. The switch 1134 routes the forward without retrieval request 1113 to a random messaging service system, in this example, messaging service system-2 1150. Messaging service system-2 1150 creates a proxy connection to the messaging service system to which the forwarding request was directed, in this example, messaging service system-1 1140. Messaging service system-2 1150 routes the forwarding request 1114 to messaging service system-1 1140. Messaging service system-1 1140 synchronously responds to the forwarding message request 1114 with a forwarding acknowledgement 1115. The forwarding acknowledgement 1115 is routed through the randomly chosen messaging service system-2 1150, to the switch 1134, and ultimately to the target terminal 1120.

The embodiments of the present invention discussed in connection with FIGS. 9A, 9B, 10A, 10B, 11A, and 11B depend upon analysis of a transaction ID incorporated in an acknowledgement message to determine the correct routing for the acknowledgement message. In the example embodiment illustrated in FIGS. 9A and 9B, the load balancing switch is the network element responsible for analyzing the transaction ID to determine correct routing of the acknowledgement. In the example embodiments of FIGS. 10A, 10B, 11A and 11B, the messaging service systems are the network elements that perform the analysis of the transaction ID. In some situations, the load balancing switch and/or the messaging service systems may not be capable of resolving the correct routing for an acknowledgment by analyzing the transaction ID.

The following embodiments of the invention employ techniques of directing an acknowledgement to a number of messaging service systems until the acknowledgement reaches the correct messaging service system. In the embodiment discussed in connection with FIGS. 12A and 12B, the acknowledgement is broadcast by a first messaging service system receiving the acknowledgement to all other messaging service systems in the operator network. In the embodiment illustrated in connection with FIGS. 13A and 13B, the first messaging service system receiving the acknowledgement routes the acknowledgement to a second messaging service system. The second messaging service system routes the acknowledgement to a third messaging service system, and so forth, until the acknowledgement reaches the correct messaging service system.

Figure 12A:
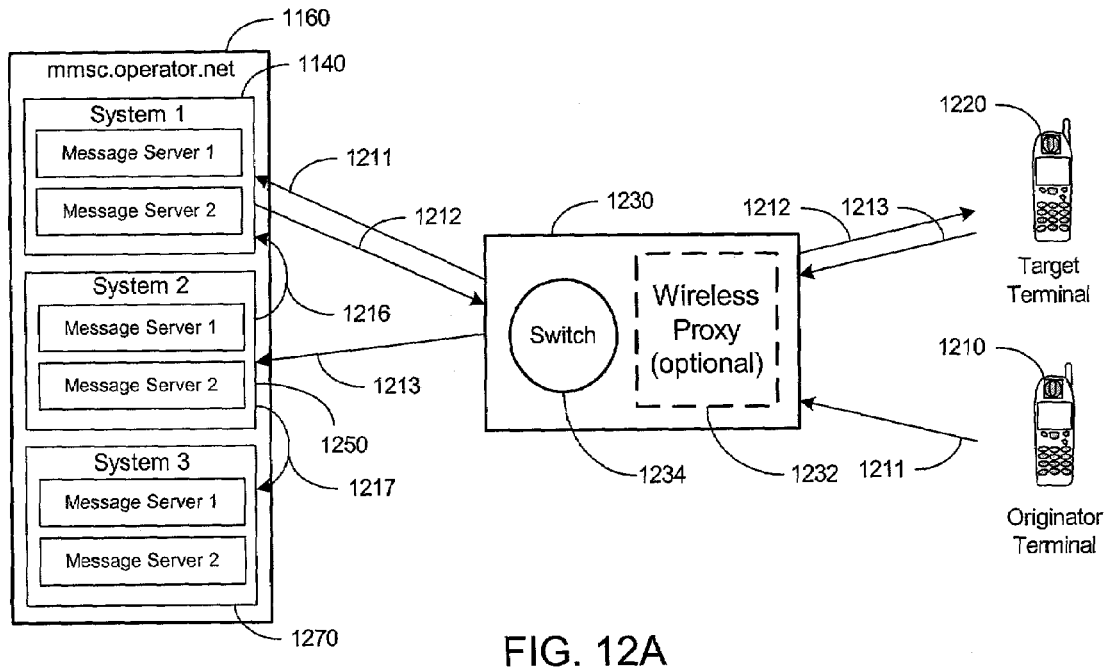
FIGS. 12A and 12B illustrate a method of directing handshaking messages by broadcasting the handshaking messages to all messaging service systems in an operator network in accordance with an embodiment of the invention.
Figure 12B:
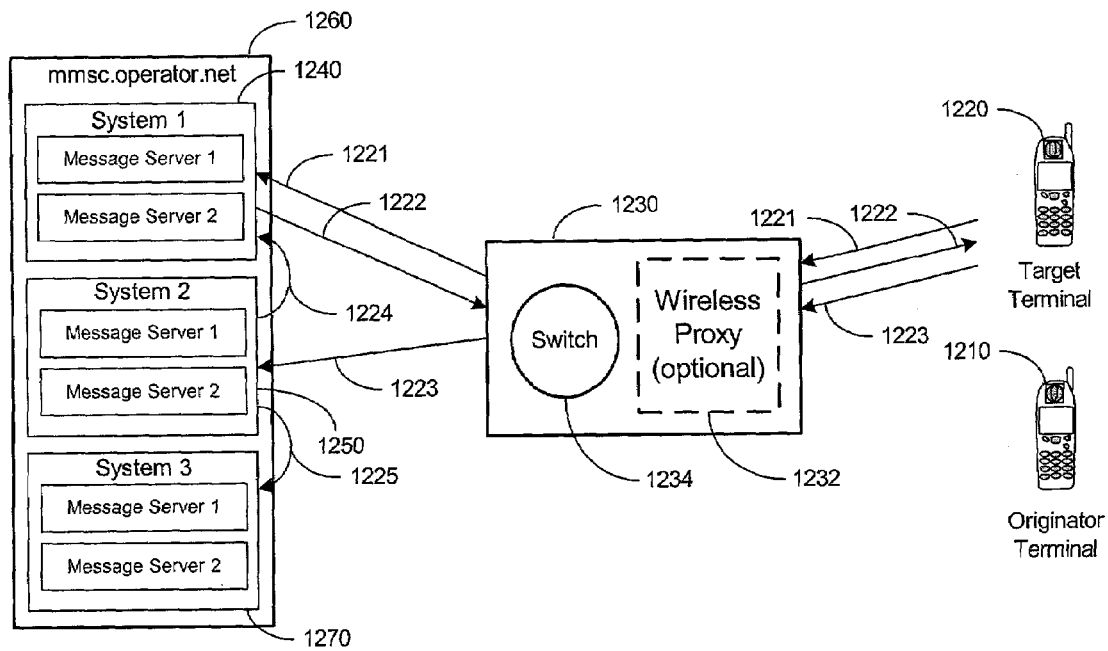

In the embodiment illustrated in the diagrams of FIG. 12A and FIG. 12B, acknowledgement messages are broadcast by a first messaging service system receiving the message to all messaging service systems in the operator network. The originator terminal 1210 initiates a message transaction by directing a message 1211 to the target terminal 1220. The message 1211 is routed by the load balancing switch 1234 for storage at a messaging service system-1 1240. Messaging service system-1 1240 transmits a notification message 1212 to the target terminal 1220.

The target terminal 1220 transmits a notification acknowledgement 1213. The switch 1234 routes the notification acknowledgement 1213 to a random messaging service system. In the example of FIG. 12A, messaging service system-2 1250 is selected as the random messaging service system. Messaging service system-2 1250 broadcasts the notification acknowledgement to every other messaging service system 1240, 1270 in the operator network 1260. Specifically, messaging service system-2 1250 routes the notification acknowledgement 1216 to messaging service system-1 1240 and also routes the notification acknowledgement 1217 to messaging service system-3 1270. Each messaging service system 1240, 1250, 1270 analyzes the notification acknowledgement to determine if the notification acknowledgement was directed to that particular messaging service system.

As illustrated in FIG. 12B, message retrieval is initiated when a target terminal 1220 transmits a message retrieval request 1221 to messaging service system-1 1240 requesting retrieval of the stored message. Messaging service system-1 1240 responds by transmitting the message 1222 to the target terminal 1220. Upon receipt of the message 1222, the target terminal 1220 transmits a delivery acknowledgement 1223.

When the delivery acknowledgement message 1223 arrives at the switch 1234, the switch 1234 is unable to resolve the correct messaging service system to which the acknowledgement is directed. The switch 1234 transmits the acknowledgement 1223 to a randomly selected messaging service system. In the example of FIG. 12B, messaging service system-2 1250 is selected.

Messaging service system-2 1250 routes the acknowledgement to every other messaging service system 1240, 1270 in the operator network 1260. Specifically, messaging service system-2 1250 routes the acknowledgement 1224 to messaging service system-1240 and also routes the acknowledgement 1225 to messaging service system-3 1270. Each messaging service system 1240, 1250, 1270 determines if the delivery acknowledgement was directed to that particular messaging service system.

Figure 13A:
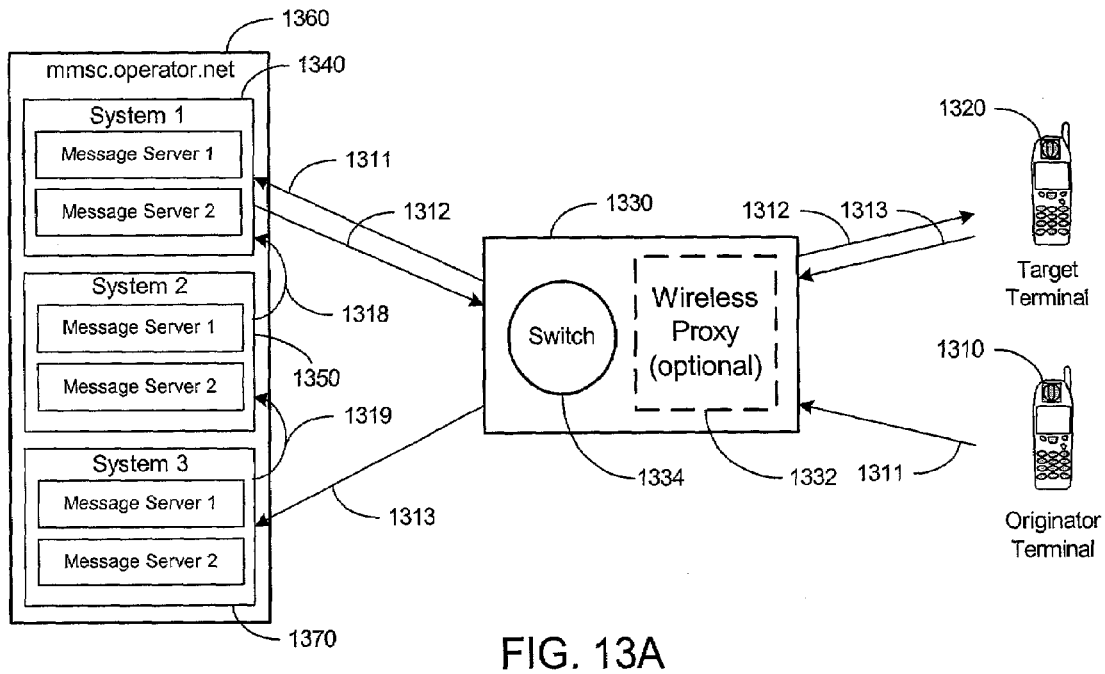
FIGS. 13A and 13B illustrate a method of directing handshaking messages by sequentially routing the handshaking messages to each messaging service system in the operator network in accordance with an embodiment of the invention.
Figure 13B:
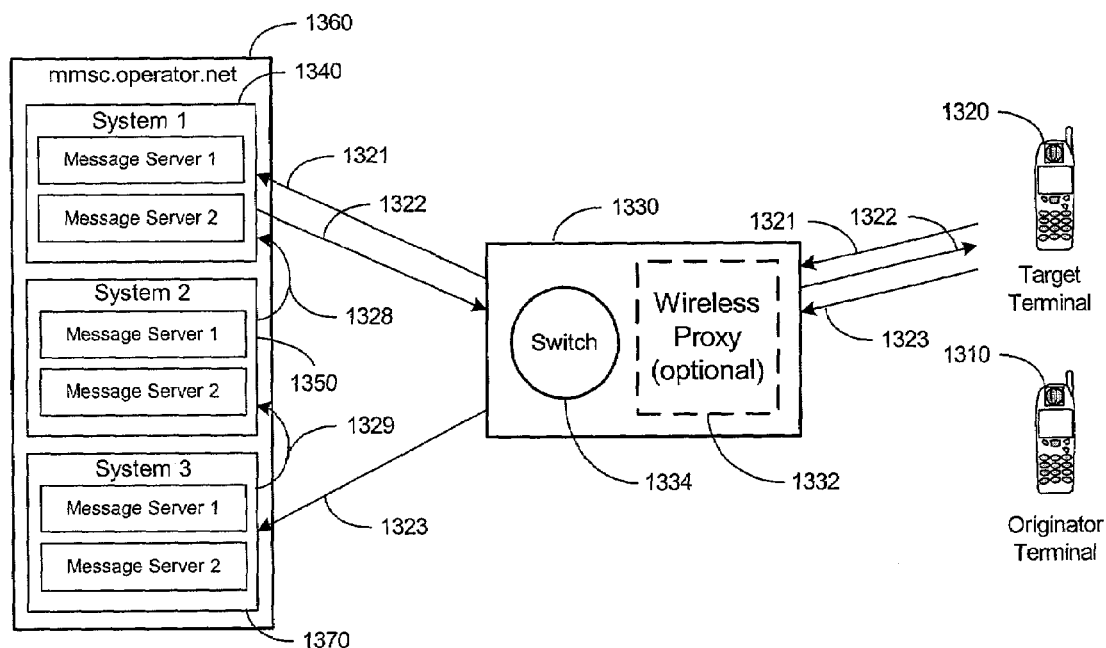

A further embodiment of the invention is illustrated in the diagrams of FIGS. 13A and 13B. A message transaction is initiated by an originator terminal 1310 directing a message 1311 to a target terminal 1320. The message 1311 is routed by the switch 1334 to messaging service system-1 1340 for storage. Messaging service system-1340 transmits a message notification 1312 to the target terminal 1320.

The target terminal 1320 responds to the notification message 1312 by transmitting a notification acknowledgement 1313. When the notification acknowledgement 1313 reaches the switch, 1334, the switch 1334 is unable to resolve the correct messaging service system to which the notification acknowledgement is directed. The switch 1334 transmits the notification acknowledgement 1313 to a messaging service system in the operator network. In the example of FIG. 13, the notification acknowledgement 1313 is first routed to messaging service system-3 1370.

Messaging service system-3 1370 analyzes the notification acknowledgement to determine if the notification acknowledgement was intended for messaging service system-3 1370. If the notification acknowledgement 1313 was not directed to messaging service system-3 1370, messaging service system-3 1370 routes the notification acknowledgement 1319 to messaging service system-2 1350. Messaging service system-2 1350 analyzes the notification acknowledgement to determine if the notification acknowledgement was intended for messaging service system-2 1350. If not, messaging service system-2 1350 routes the notification acknowledgement 1318 to messaging service system-1340.

In a similar manner, the delivery acknowledgement is routed successively to each messaging service system in the operator network until the delivery acknowledgement reaches the correct messaging service system. As illustrated in FIG. 13B, a target terminal 1320 may request message delivery by transmitting a message delivery request 1321 to the messaging service system where a message is stored, in this example messaging service system-1 1340. Messaging service system-1 1340 responds by transmitting the message 1322 to the target terminal 1320.

The target terminal 1320 acknowledges receipt of the message 1322 by transmitting a delivery acknowledgement 1323. When the delivery acknowledgement 1323 reaches the switch, 1334, the switch 1334 is unable to resolve the messaging service system to which the delivery acknowledgement 1323 is directed. The switch 1334 routes the delivery acknowledgement 1323 to a messaging service system in the operator network 1360. In the example of FIG. 13B, the switch 1334 routes the delivery acknowledgement 1323 to messaging service system-3 1370.

Messaging service system-3 1370 determines that the delivery acknowledgement was not directed to messaging service system-3 1370 and routes the delivery acknowledgement 1329 to the next messaging service system, messaging service system-2 1350. Messaging service system-2 1350 determines that the delivery acknowledgement 1329 was not directed to messaging service system-2 1350. Messaging service system-2 1350 routes the delivery acknowledgement 1328 to messaging service system-1 1340. In this manner, the delivery acknowledgement is directed to each messaging service system until the delivery acknowledgement reaches the correct messaging service system.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

What is claimed is:

1. A method for sending messaging information between an originator terminal and a target terminal in an operator network having several messaging systems, comprising:
    initiating a message transaction by sending a message from the originator terminal to the target terminal;
    storing the message on a particular messaging service system in the operator network having several messaging service systems; and
    directing one or more handshaking messages from the target terminal to the particular messaging service system, each handshaking message indicating a status of the message transaction, wherein the one or more handshaking messages are not addressed to the particular messaging service system of the plurality of messaging service systems.

2. The method of claim 1, wherein sending the message from the originator terminal to the target terminal comprises sending multimedia messaging information.

3. The method of claim 1, wherein storing the message on the particular messaging system comprises selecting the particular messaging service system according to one or more load balancing parameters.

4. The method of claim 3, wherein selecting the particular messaging service system according to one or more load balancing parameters comprises distributing the message to the particular messaging service system based on response times of the several messaging service systems in the operator network.

5. The method of claim 3, wherein selecting the particular messaging service system according to one or more load balancing parameters comprises distributing the message to the particular messaging service system based on storage capacities of the several messaging service systems in the operator network.

6. The method of claim 1, wherein directing the one or more handshaking messages from the target terminal to the particular messaging service system comprises sending a notification acknowledgement from the target terminal to the particular messaging service system confirming that a message notification was received by the target terminal.

7. The method of claim 6, wherein sending the notification acknowledgement from the target terminal to the particular messaging system comprises sending the notification acknowledgement including a transaction identifier.

8. The method of claim 7, further comprising:
including the transaction identifier in a notification message from the particular messaging service system to the target terminal; and
directing the notification acknowledgement from the target terminal to the particular messaging service system using the transaction identifier.

9. The method of claim 7, wherein sending the notification acknowledgement comprises:
including an information element in a notification message from the particular messaging service system to the target terminal, the information element associating a data packet with the message transaction;
incorporating the information element into the notification acknowledgement; and
directing the notification acknowledgement from the target terminal to the particular messaging service system using the information element.

10. The method of claim 1, wherein directing the one or more handshaking messages from the target terminal to the particular messaging service system comprises sending a delivery acknowledgement from the target terminal to the particular messaging service system confirming that a message has been received by the target terminal.

11. The method of claim 10, wherein sending the delivery acknowledgement from the target terminal to the particular messaging service system comprises sending the delivery acknowledgement including a transaction identifier.

12. The method of claim 11, further comprising:
including the transaction identifier in a notification message from the particular messaging service system to the target terminal; and
directing the delivery acknowledgement from the target terminal to the particular messaging service system using the transaction identifier.

13. The method of claim 11, further comprising:
including an information element in a notification message from the particular messaging service system to the target terminal, the information element including the transaction identifier associating a data packet with a particular message transaction; and
directing the delivery acknowledgement from the target terminal to the particular messaging service system using the transaction identifier specified in the information element.

14. The method of claim 1, wherein directing the one or more handshaking messages from the target terminal to the particular messaging service system comprises using a transaction identification to route the one or more handshaking messages to the particular messaging service system to which the one or more handshaking messages are directed.

15. The method of claim 14, wherein using the transaction identification to route the one or more handshaking messages comprises using a load balancing switch to analyze the transaction identification for determining the location of the particular messaging service system to which the one or more handshaking messages are directed.

16. The method of claim 14, wherein using the transaction identification to route the one or more handshaking messages comprises using one or more of the several messaging service systems to analyze the transaction identification to determine the location of the particular messaging service system to which the one or more handshaking messages are directed.

17. The method of claim 16, wherein using one or more of the several messaging service systems to analyze the transaction identification comprises:
routing the one or more handshaking messages from the target terminal to a randomly selected messaging service system in the operator network; and
using the randomly selected messaging service system to determine the location of the particular messaging service system.

18. The method of claim 1, wherein directing the one or more handshaking messages comprises sending a notification acknowledgement message.

19. The method of claim 1, wherein directing the one or more handshaking messages comprises sending a delivery acknowledgement message.

20. The method of claim 1, wherein directing the one or more handshaking messages comprises routing a forwarding request from the target terminal to the particular messaging service system.

21. The method of claim 1, wherein directing the one or more handshaking messages from the target terminal to the particular messaging service system further comprises:
sending the one or more handshaking messages from the target terminal to a randomly selected messaging service system in the operator network; and
routing the one or more handshaking messages from the randomly selected messaging service system to each messaging service system in the operator network.

22. The method of claim 21, wherein sending the one or more handshaking messages from the target terminal to the randomly selected messaging service system includes sending a notification acknowledgement.

23. The method of claim 21, wherein sending the one or more handshaking messages from the target terminal to the randomly selected messaging service system includes sending a delivery acknowledgement.

24. The method of claim 1, wherein sending the one or more handshaking messages from the target terminal to the particular messaging service system further comprises sequentially routing the one or more handshaking messages to each messaging service system until the one or more handshaking messages are routed to the particular messaging service system.

25. A messaging system, comprising:
a first mobile terminal and a second mobile terminal, the first mobile terminal initiating a message transaction by sending a message to the second mobile terminal;
a particular messaging service system coupled to the first and the second mobile terminals and occupying an operator network including several messaging service systems, the particular messaging service system configured to store the message sent by the first mobile terminal and receive handshaking messages regarding the status of the message transaction directed from the second mobile terminal to the particular messaging service system, and
circuitry configured to direct the handshaking messages to the particular messaging service system, wherein the handshaking messages directed from the second mobile terminal to the particular messaging service system are not addressed to the particular messaging service system.

26. The system of claim 25, wherein the message sent by the first mobile terminal to the second mobile terminal is a multimedia message.

27. The system of claim 25, wherein the circuitry configured to direct the handshaking messages comprises a load-balancing switch coupled to the several messaging service systems.

28. The system of claim 25, wherein the second mobile terminal sends a notification acknowledgement to the particular messaging service system confirming that a message notification has been received by the second mobile terminal.

29. The system of claim 25, wherein the second mobile terminal incorporates a transaction identification into the handshaking messages, the transaction identifier used to direct the handshaking messages to the particular messaging service system.

30. The system of claim 25, wherein the particular messaging service system incorporates a transaction identification into a notification message sent from the particular messaging service system to the second mobile terminal and the second mobile terminal incorporates the transaction identifier into a notification acknowledgement to the particular messaging service system.

31. The system of claim 25, wherein the particular messaging service system incorporates a transaction identifier associating a data segment with a message transaction into a notification message to the second mobile terminal and the second mobile terminal includes the transaction identifier in a notification acknowledgement to the particular messaging service system.

32. The system of claim 25, wherein the second mobile terminal directs a delivery acknowledgement to the particular messaging service system to confirm that a message has been received by the second mobile terminal.

33. The system of claim 25, wherein the second mobile terminal is configured to include a transaction identifier in a delivery acknowledgement to the particular messaging service system.

34. The system of claim 25, wherein the particular messaging service system incorporates a transaction identifier into a notification message sent to the second mobile terminal and the second mobile terminal includes the transaction identifier in a delivery acknowledgement to the particular messaging service system.

35. The system of claim 25, wherein the particular messaging service system incorporates a transaction identifier associating a data segment with a message transaction into a notification message to the second mobile terminal and the second mobile terminal includes the transaction identifier in a delivery acknowledgement to the particular messaging service system.

36. The system of claim 25, wherein the circuitry configured to direct the handshaking messages is incorporated into one or more of the several messaging service systems.

37. The system of claim 25, wherein the circuitry configured to direct the handshaking messages comprises uses a transaction identification to route the handshaking messages to the particular messaging service system to which the handshaking messages are directed.

38. The system of claim 37, wherein a load-balancing switch routes the handshaking messages from the second mobile terminal to a randomly selected messaging service system, the randomly selected messaging service system analyzes the transaction identification to identify the particular messaging service system and routes the handshaking messages to the particular messaging service system to which the handshaking messages are directed.

39. The system of claim 37, wherein a load-balancing switch sends the handshaking messages from the second mobile terminal to a randomly selected messaging service system in the operator network and the randomly selected messaging service system routes the handshaking messages to each messaging service system in the operator network.

40. The system of claim 25, wherein the circuitry configured to direct the handshaking messages is distributed among the several messaging service systems and each messaging service system in the operator network routes the handshaking messages to another messaging service system until the handshaking messages are routed to the particular messaging service system.

41. A messaging system, comprising:
means for initiating a message transaction by sending a message from an originator terminal to a target terminal;
means for storing the message on a particular messaging service system in an operator network having several messaging service systems; and
means for directing one or more handshaking messages from the target terminal to the particular messaging service system, each handshaking message indicating a status of the message transaction, wherein the one or more handshaking messages are not addressed to the particular messaging service system of the plurality of messaging service systems.

42. The system of claim 41, wherein means for initiating a message transaction by sending a message from an originator terminal to a target terminal comprises means for sending multimedia messaging information.

43. The system of claim 41, wherein means for directing the one or more handshaking messages from the target terminal to the particular messaging service system comprises means for directing the one or more handshaking messages to the particular messaging service system based on a transaction identification.

44. The system of claim 41, wherein means for directing the one or more handshaking messages from the target terminal to the particular messaging service system comprises means for using a transaction identification associating a data packet with a particular message transaction for directing the one or more handshaking messages to the particular messaging service system.

45. The system of claim 41, wherein means for directing the one or more handshaking messages from the target terminal to the particular messaging service system comprises means for using a load-balancing switch to determine the location of the particular messaging service system by analyzing a transaction identification.

46. The system of claim 41, wherein means for directing the one or more handshaking messages from the target terminal to the particular messaging service system comprises means for using one or more of the several messaging service systems to determine a location of the particular messaging service system by analyzing a transaction identification.

47. The system of claim 41, wherein means for directing the one or more handshaking messages from the target terminal to the particular messaging service system comprises means for sending the one or more handshaking messages to each messaging service system in the operator network.

48. The system of claim 41, wherein means for directing the one or more handshaking messages from the target terminal to the particular messaging service system comprises means for sequentially routing the one or more handshaking messages to each messaging service system until the one or more handshaking messages are routed to the particular messaging service system.

49. A computer-readable medium having computer-executable instructions for sending messaging information between an originator terminal and a target terminal in an operator network having several messaging systems, the computer-executable instructions performing a method comprising:

initiating a message transaction by sending a message from the originator terminal to the target terminal;

storing the message on a particular messaging service system in the operator network having several messaging service systems; and directing one or more handshaking messages from the target terminal to the particular messaging service system, each handshaking message indicating a status of the message transaction, wherein the one or more handshaking messages are not addressed to the particular messaging service system of the plurality of messaging service systems.

50. A mobile terminal, comprising:

a receiver configured to receive communications signals through a wireless network; and a transmitter configured to transmit handshaking messages through a wireless network for receipt by a particular messaging service system of a plurality of messaging service systems in an operator network, wherein the handshaking messages are not addressed to the particular messaging service system and are received by the particular messaging service system.

51. The mobile terminal of claim 50, wherein:

the receiver is configured to receive a message notification from the particular messaging service system incorporating a transaction identifier; and the transmitter is configured to send a notification acknowledgement including the transaction identifier to the particular messaging service system confirming that the message notification has been received.

52. The mobile terminal of claim 50, wherein the transmitter is configured to direct handshaking messages to the particular messaging service system, the handshaking messages including a transaction identifier associating a data segment with the particular message transaction.

\* \* \* \* \*